United States Patent Office 3,814,738
Patented June 4, 1974

3,814,738
METHYLSTYRENE/STYRENE/ISOBUTENE TERPOLYMER RESINS AND PROCESS FOR THEIR MANUFACTURE
Leander Feiler, Gersthofen, and Helmut Korbanka, Adelsried, Germany, assignors to Farbwerke Hoechst Aktiengesellschaft vormals Meister Lucius & Bruning, Frankfurt am Main, Germany
No Drawing. Filed Nov. 13, 1972, Ser. No. 305,668
Claims priority, application Germany, Nov. 18, 1971, P 21 57 231.6
Int. Cl. C08f 19/00
U.S. Cl. 260—80.78                    2 Claims

ABSTRACT OF THE DISCLOSURE

There are disclosed and claimed novel terpolymers of α-methylstyrene, styrene and isobutene having excellent properties which enable them especially to be used in the adhesives and coatings field, as well as the method for preparing said terpolymers.

---

In the field of coatings and adhesives, large quantities of resin adhesives are required; suitable materials for these applications are polyterpene resins and resins on the basis of rosin. Because of increasing scarcity and mounting prices of the raw materials, entirely synthetic products on the basis of cheap monomers have been developed in the meantime.

In French Pat. No. 1,581,675, for example, a relatively dark petroleum resin (iodine color scale according to DIN 6162=15 to 30) is described, which is obtained by cationic polymerization of a certain petroleum crack fraction containing as substantial components cyclohexadiene and methyl-cyclopentadiene. It is furthermore known that brown resins may be synthesized by polymerization of petroleum fractions containing above all vinyltoluene, indene, styrene and aliphatic olefins, and that these resins may be brightened by hydrogenation (French Pat. No. 1,574,331).

According to German Offenlegungsschrift No. 1,520,376, the polymerization of a mixture of two hydrocarbon fractions, one fraction rich in unsaturated aliphatics (butene, butadiene etc.) and the other rich in aromatics (styrene, indene etc.), yields relatively dark products (iodine color scale 30 to 130) which are suitable for paper sizing. By polymerization of a certain petroleum crack fraction with a liquid catalyst (AlCl$_3$/HCl/aromatic hydrocarbon), yellowish resins are obtained (iodine color scale 3 to 7), the color of which, however, darkens when they are heated to 150° C. According to German Offenlegungsschrift No. 2,001,453, very light colored resins are obtained by copolymerization of α-methylstyrene and vinyltoluene.

Disadvantages of the resins obtained from petroleum fractions are their relatively dark color and the insufficient thermostability which shows in a darkening of the resins under thermal load. However, precise thermostability is a property increasingly required for a resin adhesive, since thermoplastic adhesive and thermoplastic pressure-sensitive adhesive formulations which, as is known, are often subjected to temperatures of from 180° to 200° for longer periods of time, become more and more interesting.

Though resins on the basis of α-methylstyrene/vinyltoluene and polyterpene resins are described to be very thermostable, they are nevertheless relatively expensive and do not impart sufficient tack to the thermoplastic pressure-sensitive adhesive mixtures, for example on the basis of ethylene-vinyl acetate copolymer/chlorinated paraffin. Resins on the basis of rosin, on the other hand, do impart a good tack, but they generally do not meet the requirements with respect to thermostability, so that the adhesives darken to a considerable extent. Moreover, α-methylstyrene/vinyltoluene, polyterpene and rosin resins are obtained from raw materials which, in part, are not easily available, at least not in the quantities required.

As results from our own tests, also cationically polymerized styrene/isobutene and styrene/α-methylstyrene copolymers are hardly suitable for application as resin adhesives, since they have a yellow color and they are not sufficiently compatible with gasoline, paraffin and ethylene-vinyl acetate copolymers.

Surprisingly, it has now been found that resins without the abovementioned drawbacks, which possess all properties for use in the adhesives and coatings field, such as light color, good thermostability, compatibility, necessary tack properties, softening points in the desired range and the like, are obtained by polymerizing ternary mixtures of α-methylstyrene, styrene and isobutene, the components of this mixture being in a determined ratio.

The present invention therefore provides a process for the manufacture of terpolymer resins by cationic terpolymerization of α-methylstyrene, styrene and isobutene, which comprises polymerizing mixtures of from 10 to 50, preferably from 15 to 40, especially from 30 to 40 weight percent of α-methylstyrene; from 40 to 85, preferably from 40 to 80, especially from 45 to 65 weight percent of styrene and from 5 to 50, preferably from 5 to 30, especially from 10 to 20 weight percent of isobutene in the presence of Friedel-Crafts catalysts and in the presence of solvents in a temperature range of from −20° to +100° C.

As already mentioned above, the terpolymers obtained in accordance with the present invention are of a very light color and well compatible with the solvents, polymers and other substances contained in pressure-sensitive adhesives, thermoplastic adhesives, coating compositions and similar formulations. Especially their extraordinary thermostability is remarkable. Heating at 200° C. only results in insignificant darkening of the color.

There are no special requirements as to the purity degree of the α-methylstyrene, styrene and isobutene monomers to be used in accordance with the present invention, which are cheap and easily available raw materials. Industrial grade products may be unhesitatingly employed. The copolymerization is carried out in the presence of Friedel-Crafts catalysts, for example AlBr$_3$, SnCl$_4$, TiCl$_4$, BF$_3$ and BF$_3$ adducts. Especally suitable are AlCl$_3$ and adducts of BF$_3$ and diethyl ether (OEt$_2$), acetic acid, methanol, water and the like. The amount of catalyst is from 1 to 6, preferably from 3 to 5, weight percent, relative to the monomer mixture. The reaction is carried out in the presence of solvents the water content of which should be below 0.1%. Suitable solvents are for example aliphatic hydrocarbons having boiling points up to 160° C. (for example light gasolines), aromatic hydrocarbons having boiling points up to 160° C. (for example especially toluene), or light chlorinated hydrocarbons having from 1 to 6 carbon atoms (for example methylene chloride, tetrachloro-ethylene or chlorobenzene). The amount of diluent (solvent) is from 20 to 150 volume percent, preferably from 30 to 80 volume percent, relative to the volume of the monomer mixture.

The copolymerization is carried out in a temperature range of from −20° to +100° C., preferably from 0 to 60° C. Generally, it is possible to copolymerize monomer mixtures containing only from 5 to 20% of isobutene even at 40° to 50° C. without pressure; at higher percentages of isobutene, however, it is necessary to operate in a closed vessel.

The resins of the invention are preferably manufactured as follows: the monomer mixture is allowed to run into the catalyst dissolved or suspended in the solvent, while stirring and excluding atmospheric oxygen; the polymerization temperature being maintained by cooling or heating. When gaseous $BF_3$ is used as catalyst, the solvent is first introduced and the catalyst is fed in while the monomer mixture is added dropwise. In order to complete the reaction the polymer containing reaction mixture is further reacted for 1 to 6 hours, preferably for 2 to 5 hours. During this period, in the case where a $BF_3$ catalyst is used, a temperature between that of the polymerization and the boiling point of the solvent employed may be chosen, in all other cases the temperature of the main reaction is maintained.

After the reaction is complete, there are different possibilities of work-up, depending on the catalyst used. When a volatile $BF_3$ catalyst, for example $BF_3 \cdot OEt_2$, is employed, a common separation of solvent (for example toluene or xylene) and catalyst by distillation is advantageous; in this case, the cross-linking and darkening of the polymer which is observed when $AlCl_3$ containing polymers are heated does not occur. This operation mode, as compared to a water washing which of course is also possible in principle, shortens the course of synthesis. Since the catalyst/solvent mixture can be reused, there are no sewage problems.

$BF_3$ containing catalysts may also be separated from the polymer solution by precipitation as the ammonia adduct, from which the catalyst may be regenerated according to known processes.

Finally, the already mentioned water washing may be cited as work-up method. Especially in the case of catalysts of low volatility which, at elevated temperature, would cause cross-linking and decoloration of the polymer, this process must be exclusively employed.

The resins are isolated according to generally known methods by complete removal of those compounds which are volatile up to 200° C. *in vacuo* while blowing in steam.

The terpolymers of the invention practically do not contain any homopolymers.

From a statistical standpoint, they are composed in such a manner, that, depending on the ratio of charge, from 8.8 to 91 molecules of styrene and from 2 to 63.5 molecules of isobutene are bound to 10 units of α-methylstyrene.

The softening point of the resins is in a range of from 50° to 120° C.; and those products are of preferred general interest for industrial purposes the softening point of which (according to DIN 1995) is in a temperature range of from 70° to 100° C. The resins are furthermore characterized by a density (20° C.) of from 1.01 to 1.07, a refractive index ($n_D^{20}$) of from 1.56 to 1.61 and a relative viscosity (30% solution in toluene at 25° C.) of from 1.00 to 7.00.

The resins of the invention, because of their good properties, for example light color, excellent thermostability and good compatibility with those materials which are employed in the adhesives and coatings field (gasoline, paraffin, ethylene-vinyl acetate copolymers), have a wide application range. They especially impart excellent tack and thermostability to thermoplastic pressure-sensitive adhesives on the basis of ethylene-vinyl acetate copolymer/chlorinated paraffin. An important application for such thermoplastic pressure-sensitive adhesives is for example that of colorless adhesive tapes.

The following examples illustrate the invention.

STANDARD PREPARATION PRESCRIPTION

In a three-necked flask which can be heated and cooled, provided with stirrer, reflux condenser, $CaCl_2$ tube and thermometer, at the polymerization temperature chosen, the monomer mixture is added dropwise, under $N_2$ protection, to the thoroughly stirred solvent/catalyst mixtures. After the monomer is added, the reaction of the batch is allowed to complete at the determined temperature while stirring thoroughly. Depending on the catalyst used, different work-up processes are possible:

(a) From $AlCl_3$ or $AlBr_3$, $SnCl_4$, $TiCl_4$ etc. containing, but also from $BF_3$ containing polymer solutions (Examples 1 to 4 and 5 to 7), the catalyst may be removed by intense shaking-out with water. After filtration of the organic phase, the solvent is distilled off, finally at 200° C. *in vacuo* (from 10 to 100 mm. Hg). Low molecular weight compounds are removed by vacuum steam distillation at 200° to 220° C. (=resin oil).

(b) Volatile, $BF_3$ containing catalysts, for example $BF_3$ etherate (Example 10), are distilled off together with the solvent, optionally while reducing the pressure; solvent and catalyst residues and low molecular weight compounds being removed at 200° C. *in vacuo* by blowing in steam. The catalyst containing distillate may be reused; a catalyst deficit must be covered.

(c) $BF_3$ containing catalysts (Examples 8,9) may be converted to an ammine adduct sparingly soluble in organic solvents by introducing ammonia; the adduct then being separated from the polymer solution by filtration. The further work-up of the polymer solution is carried out by distillation as described. The ammine adduct may be divided into $(NH_4)_2SO_4$ and $BF_3$ with the aid of sulfuric acid according to known processes.

Preparation data and characteristic parameters for a number of Examples of terpolymer resins according to the invention are listed in the following Table:

| | Preparation data | | | | | Characteristic parameters | | | | | | |
|---|---|---|---|---|---|---|---|---|---|---|---|---|
| Example | Comonomers, weight percent M/S/I[a] | Catalyst Percent[b] | Type | Reaction temperature (° C.) | Solvent | Yield (percent) | S.P.[c] (° C.) | $d^{20}$[d] | $n_D^{20}$[e] | $\eta_{rel.}$[f] | ICS[g] | ICS after thermal load[h] |
| 1 | 30/60/10 | 4 | $AlCl_3$ | 0 | o-Xylene | 86 | 85 | 1.045 | 1.590 | 3.37 | 4 | |
| 2 | 30/50/20 | 4 | $AlCl_3$ | 10 | $CH_2Cl_2$ | 70 | 73 | 1.027 | 1.581 | 2.99 | 7 | |
| 3 | 40/50/10 | 4 | $AlCl_3$ | 0 | $CH_2Cl_2$ | 75 | 80 | 1.050 | 1.592 | 3.03 | 7-10 | 10-15 |
| 4 | 15/75/10 | 4 | $AlCl_3$ | 10 | $CH_2Cl_2$ | 84 | 98 | 1.054 | 1.591 | 3.44 | 10 | |
| 5 | 40/50/10 | 4 | $BF_3 \cdot OEt_2$ | 20 | Toluene | 92 | 94 | 1.046 | 1.588 | 3.36 | 1 | 1-2 |
| 6 | 30/50/20 | 4 | $BF_3 \cdot OEt_2$ | 20 | do | 86 | 79 | 1.031 | 1.581 | 3.08 | 1 | |
| 7 | 30/60/10 | 4 | $BF_3 \cdot 2CH_3CO_2H$ | 20 | do | 97 | 94 | 1.043 | 1.586 | 3.62 | 1-2 | |
| 8 | 30/60/10 | 4 | $BF_3 \cdot 2H_2O$ | 20 | do | 88 | 92 | 1.055 | 1.594 | 3.71 | 1-2 | |
| 9 | 30/60/10 | | $BF_3$ | 20 | do | 89 | 81 | 1.045 | 1.592 | 3.44 | 2 | |
| 10 | 30/60/10 | 4 | $BF_3 \cdot OEt_2$ | 40 | do | 93 | 80 | 1.043 | 1.587 | 3.02 | 1 | 2 |
| 11 | 30/60/10 | 6 | $AlCl_3$ | −10 | do | 89 | 95 | 1.051 | 1.594 | 4.09 | 3 | |
| 12 | 30/60/10 | 5.3 | $BF_3 \cdot 2CH_3CO_2H$ | 20 | do | 86 | 57 | 1.039 | 1.589 | 2.66 | 1-2 | |
| 13 | 30/60/10 | 3.7 | $BF_3 \cdot 2CH_3CO_2H$ | 20 | do | 79 | 82 | 1.045 | 1.585 | 3.21 | 1-2 | |
| 14 | 30/60/10 | 3 | $BF_3 \cdot 2H_2O$ | 50 | do | 72 | 79 | 1.052 | 1.594 | 3.17 | 1-2 | |
| 15 | 30/60/10 | 4 | $BF_3 \cdot OEt_2$ | 20 | do | 93 | 95 | | | 3.80 | 1 | |

[a] M=α-Methylstyrene; S=styrene; I=isobutene.
[b] Percent relative to monomers used.
[c] Softening point (ring-ball) acc. to DIN 1995.
[d] Density at 20° C.
[e] Refractive index at 20° C.
[f] Rel. viscosity of the 30% solution in toluene at 25° C.
[g] Iodine color scale acc. to DIN 6162.
[h] Resin melt maintained for 5 hours at 200° C. in air.

The very good oxidation and color stability of the resins is proved by the following test:

300 g. of the resin obtained according to Example 15 are melted. Subsequently, an air current of about 7.5 liters/minute is passed for 5 hours through the melt maintained at 150° C. The total amount of air is 2200 liters.

The alteration of the resin is shown in the following Table:

| | Characteristic parameters of the resin | |
|---|---|---|
| | Before air treatment | After air treatment |
| S.P. (° C.) | 95 | 92 |
| ICS | 1 | 1–2 |
| $\eta_{rel}$ | 3.80 | 3.70 |
| Molecular weight | 1680 | 1630 |
| Saponification number (consumption of KOH in mg. per g. of polymer) | 1.7 | 9.3 |

What is claimed is:

1. Terpolymer resins of $\alpha$-methylstyrene, styrene and isobutene having softening points (according to DIN 1995) in the range of from 50° to 120° C., which contain from 8.8 to 91 molecules of styrene and from 2 to 63.5 molecules of isobutene per 10 monomer units of $\alpha$-methylstyrene.

2. Terpolymer resins of $\alpha$-methylstyrene, styrene and isobutene obtained by cationically polymerizing mixtures of from 10 to 50 weight percent of $\alpha$-methylstyrene, from 40 to 85 weight percent of styrene and from 5 to 40 weight percent of isobutene in the presence of Friedel-Crafts catalysts and in the presence of solvents in a temperature range of from $-20°$ to $+100°$ C.

References Cited

UNITED STATES PATENTS

| 3,753,961 | 8/1973 | St. Cyr | 260—80.78 |
| 2,609,359 | 9/1952 | Sparks et al. | 260—79.5 |
| 2,274,749 | 3/1942 | Smyers | 260—86 |
| 2,213,423 | 9/1940 | Wiezevich | 260—4 |

FOREIGN PATENTS

| 676,759 | 12/1963 | Canada | 260—80.78 |
| 675,910 | 12/1963 | Canada | 260—80.78 |

JOSEPH L. SCHOFER, Primary Examiner
A. L. CLINGMAN, Assistant Examiner

U.S. Cl. X.R.

117—122 R